US007712678B2

(12) United States Patent
Mizukoshi

(10) Patent No.: US 7,712,678 B2
(45) Date of Patent: May 11, 2010

(54) VEHICLE TEMPERATURE REGULATION CONTROL UNIT

(75) Inventor: Takeo Mizukoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 828 days.

(21) Appl. No.: 11/191,759

(22) Filed: Jul. 28, 2005

(65) Prior Publication Data

US 2006/0021363 A1 Feb. 2, 2006

(30) Foreign Application Priority Data

Aug. 2, 2004 (JP) ............................. 2004-226003

(51) Int. Cl.
*G05D 23/00* (2006.01)
*G01K 13/00* (2006.01)
*H01H 13/76* (2006.01)
(52) U.S. Cl. ............................. 236/94; 62/129; 200/5 D; 200/5 E
(58) Field of Classification Search .................. 236/94, 236/49.3, 1 C; 62/129, 244; 200/11 R, 11 TC, 200/5 R, 5 D, 5 E
See application file for complete search history.

(56) References Cited

U.S. PATENT DOCUMENTS

| 4,293,764 A | * | 10/1981 | Amrhein | ................... 200/302.2 |
| 5,983,146 A | * | 11/1999 | Sarbach | ........................ 701/36 |
| 6,529,125 B1 | * | 3/2003 | Butler et al. | ................. 340/461 |
| 2005/0133347 A1 | * | 6/2005 | Hein | ........................... 200/5 R |

FOREIGN PATENT DOCUMENTS

| DE | 10205318 A1 * | 8/2003 |
| JP | 63-165723 | 10/1988 |
| JP | 09-115376 | 5/1997 |
| JP | 10-223080 | 8/1998 |
| JP | 2000-301932 | 10/2000 |
| JP | 2003-115234 | 4/2003 |

* cited by examiner

Primary Examiner—Chen-Wen Jiang
(74) Attorney, Agent, or Firm—Rankin, Hill & Clark LLP

(57) ABSTRACT

A control unit including a switch for regulating the temperature of a passenger compartment and/or the temperature of a vehicle seat. The switch is of a unit type with a control member, a switch member, a light-emitting member, and an indicator member housed in a single case, and can be disposed anywhere near a driver.

2 Claims, 10 Drawing Sheets

VEHICLE TEMPERATURE REGULATION CONTROL UNIT

FIELD OF THE INVENTION

The present invention relates to temperature regulation control units having a switch for regulating the temperature of a passenger compartment or the temperature of a vehicle seat.

BACKGROUND OF THE INVENTION

An air-conditioning apparatus provided with a switch for regulating the temperature of a passenger compartment or the temperature of a vehicle seat is proposed in Japanese Patent Laid-Open Publication No. HEI-9-115376, for example. A control unit of this air-conditioning apparatus will be described with reference to FIGS. 11A and 11B hereof.

A control unit 201 of a vehicle air-conditioning apparatus shown in FIG. 11A includes a printed circuit board 205 on which a number of mounted switches 202, light-emitting diodes 203 and an LCD panel are mounted, a flexible printed circuit board 207 on which chip LEDs 206 are mounted at locations opposite to the mounted switches 202, and switch knobs 209 having control panels 208. The control panels 208 are illuminated by the individual chip LEDs 206 to increase the visibility of the control panels 208.

The control unit 201 in the above related art is used for regulating the temperature of a passenger compartment. The temperature of a driver seat can also be regulated by a control unit similar to the control unit 201. For example, a control unit similar to the control unit 201 is provided at an instrument panel of the vehicle, heating or cooling of a driver seat is selected via a switch knob 209, a rotary knob 211 (including a rotary volume 212 on a printed circuit board 205) is turned right to select warm air and also to set the temperature, or is turned left to select cool air and also to set the temperature.

The above control unit 201, however, needs to be provided with the switch knobs 209, the rotary knob 211 and the LCD panel 204, and the printed circuit board 205 connected thereto. The control unit 201 thus becomes large, resulting in a low degree of freedom in layout.

Therefore, there is demand for a temperature regulation control unit for use in a vehicle, having layout freedom without impairing visibility and operability.

SUMMARY OF THE INVENTION

The present invention provides a temperature regulation control unit including a switch for regulating the temperature of a passenger compartment or the temperature of a vehicle seat by a heater and/or a cooler and a blower provided in a vehicle, which comprises: at the switch, a control member provided with a plurality of buttons; a switch member operated by the control member; a light-emitting member operated by a signal outputted from the switch member; an indicator member transmitting light from the light-emitting member; and a single case member to which the control member, the switch member, the light-emitting member and the indicator member are mounted together.

That is, the control unit in the present invention constitutes a single switch with the control member, the switch member, the light-emitting member and the indicator member housed in the single case member. The control member and the indicator member can be advantageously mounted in a space approximately equal to that for a general switch, resulting in an increased degree of freedom in layout without impairing visibility and operability. Specifically, the switch can be disposed, other than at the instrument panel disposed in front of a driver seat, in the vicinity of a driver seat or a passenger seat, for example, at a center console provided between the driver seat and the passenger seat or at a door located at the side of the driver seat or the passenger seat.

The control member preferably comprises a first push button for operation to raise the temperature, and a second push button for operation to lower the temperature.

The indicator member preferably comprises a plurality of indicators to be illuminated upon operation to raise the temperature, and a plurality of indicators to be illuminated upon operation to lower the temperature.

BRIEF DESCRIPTION OF THE DRAWINGS

Preferred embodiments of the present invention will be described in detail below, by way of example only, with reference to the accompanying drawings, in which:

FIG. 11A is an exploded perspective view of a related-art control unit while

DETAILED DESCRIPTION OF THE PREFERRED EMBODIMENTS

Figure 1:
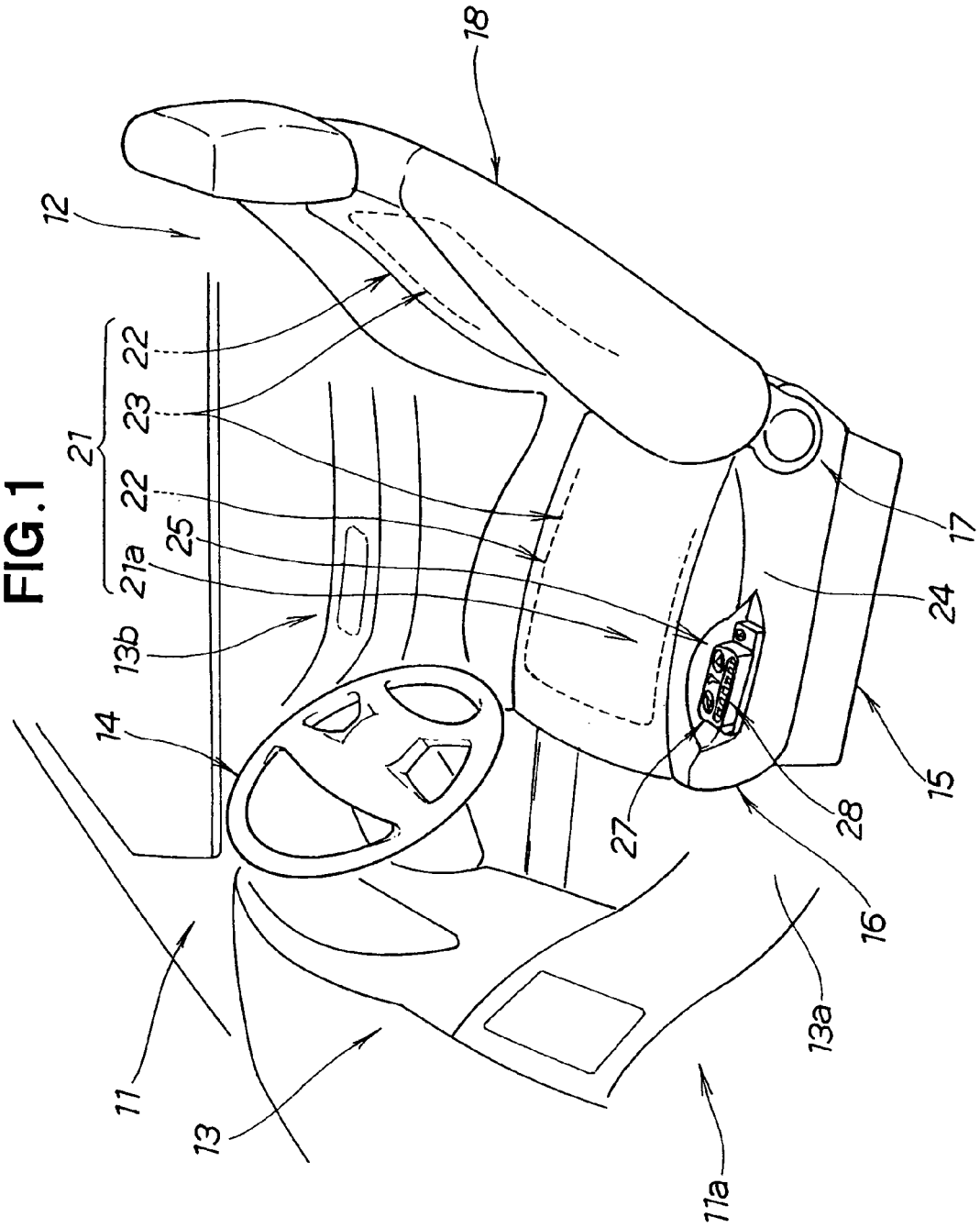
FIG. 1 is a perspective view of a driver seat for which a temperature regulation control unit in the present invention is used, and components around the driver seat.

In front of a driver seat (vehicle seat) 12 shown in FIG. 1, an instrument panel 13 and a steering wheel 14 are disposed. Reference sign Ha denotes a passenger compartment.

The driver seat 12 includes a seat cushion 16 placed on a sliding mechanism 15, a seatback 18 attached to the seat cushion 16 via a reclining mechanism 17, and a seat temperature regulating system 21.

The seat temperature regulating system 21 regulates the temperature of the driver seat 12 to a desired temperature, and includes heaters 22, 22 and blowers 23, 23 provided in the seat cushion 16 and the seatback 18, and a temperature regulation control unit 21a for setting the temperature, disposed at a left side portion 24 of the seat cushion 16. The temperature regulation control unit 21a has a switch 25.

The switch 25 includes a control member 27 for setting the amount of warm air or the amount of cool air, and an indicator member (indicator) 28 for indicating the setting via the control member 27.

The switch 25 is exemplarily disposed at the left side portion 24 of the driver seat 12, but may alternatively be disposed anywhere at the driver seat 12.

Alternatively, the switch 25 may be disposed elsewhere than at the driver seat 12. It may be mounted anywhere within the reach of an operator, for example, at the instrument panel 13 located in front of a driver, at a center console 13a provided between the driver seat 12 and a passenger seat, at a door 13b located at the side of the driver seat 12 or the passenger seat, or at the seat surface or the like in the vicinity of the driver seat. The switch 25 is operated by a driver or a front passenger.

Figure 2:
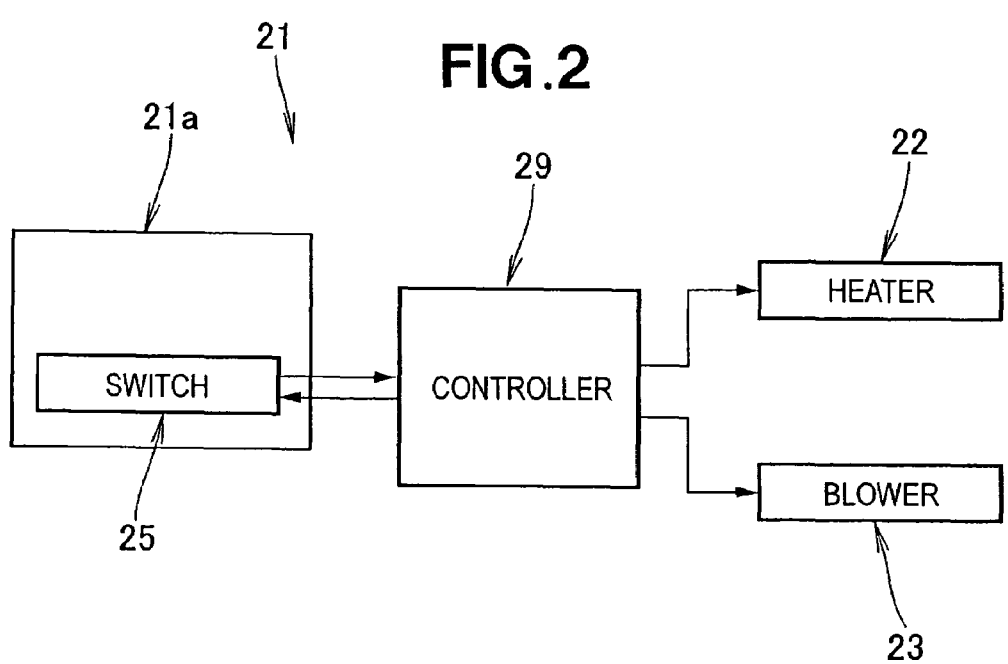
FIG. 2 is a block diagram of a vehicle seat temperature regulating system employing the temperature regulation control unit shown in FIG. 1.

FIG. 2 shows a block diagram of the seat temperature regulating system 21 employing the switch 25 of the temperature regulation control unit 21a in the present invention.

The seat temperature regulating system 21 includes the heaters 22 for heating the driver seat 12 (see FIG. 1), the blowers 23 for blowing air by a fan or the like, and a controller 29 for controlling the heaters 22 and the blowers 23.

Next, the switch 25 will be described with reference to FIG. 3.

Figure 3:
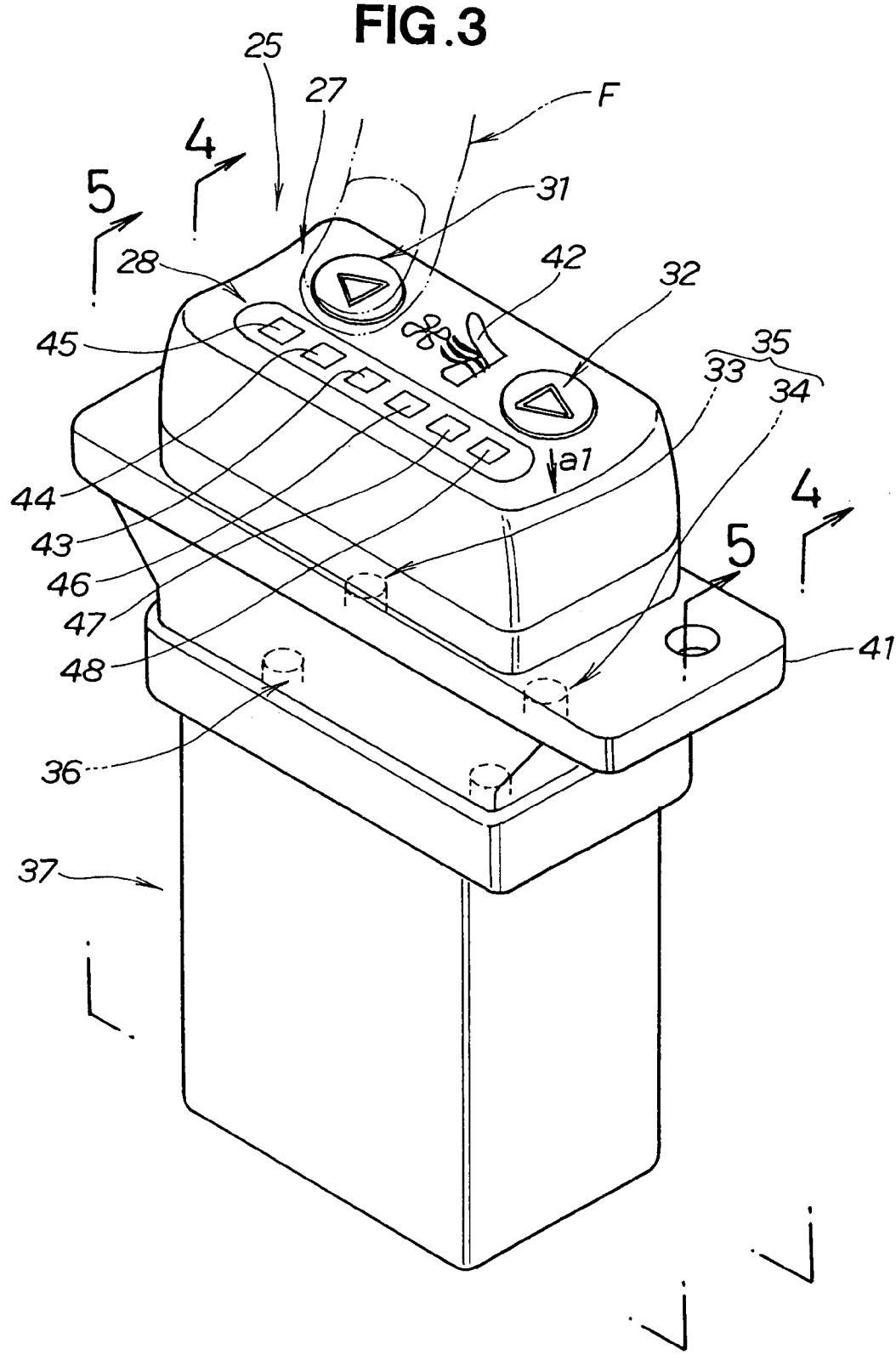
FIG. 3 is a perspective view of a switch constituting the temperature regulation control unit shown in FIG. 1.

The switch 25 shown in FIG. 3 is provided with the control member 27 having a first push button 31 and a second push button 32 to be operated with a finger F, a switch member 35 having a first switch 33 and a second switch 34 which operate upon operation of the first and second push buttons 31 and 32, respectively, a light-emitting member 36 to be turned on or off based on information from the first and second switches 33 and 34 and also based on preset conditions, the indicator member (indicator) 28 transmitting light from the light-emitting member 36, and a case member 37 to which the indicator member 28, the control member 27, the switch member 35 and the light-emitting member 36 are integrally mounted. The switch member 35 is connected to the controller 29 (see FIG. 2).

That is, the switch 25 is a single switch with the control member 27 and the indicator member 28 housed in the single case member 37, as well as a switch including the indicator member 28. Reference numeral 41 denotes a flange integrally molded with the case member 37 to be attached to a frame (not shown) of the seat cushion 16.

The control member 27 has the first push button 31 and the second push button 32 to be directly operated (in the direction of arrow a1). The first push button 31 is a warm-air button, and the second push button 32 is a cool-air button. Reference numeral 42 denotes a mark representing the control member 27 of the seat temperature regulating system 21. The mark may be of any design.

The indicator member 28 includes six indicators, first to sixth indicators 43 to 48. The first to third indicators 43 to 45 indicate the amount of warm air, for example. The amount of air indicated by the first indicator 43 is "low", the amount of air indicated by the second indicator 44 is "medium", and the amount of air indicated by the third indicator 45 is "high".

The fourth to sixth indicators 46 to 48 indicate the amount of cool air, for example. The amount of air indicated by the fourth indicator 46 is "low", the amount of air indicated by the fifth indicator 47 is "medium", and the amount of air indicated by the sixth indicator 48 is "high".

The first to sixth indicators 43 to 48 may be of any color. For example, red is used for the first to third indicators 43 to 45, and blue is used for the fourth to sixth indicators 46 to 48.

When warm air is selected, for example, one push of the first push button (warm-air button) 31 of the control member 27 illuminates the first indicator 43. If the second push button (cool-air button) 32 is pushed with the first indicator 43 illuminated, the light of the first indicator 43 is turned off, and simultaneously, warm air is stopped. The details will be described below.

Figure 4:
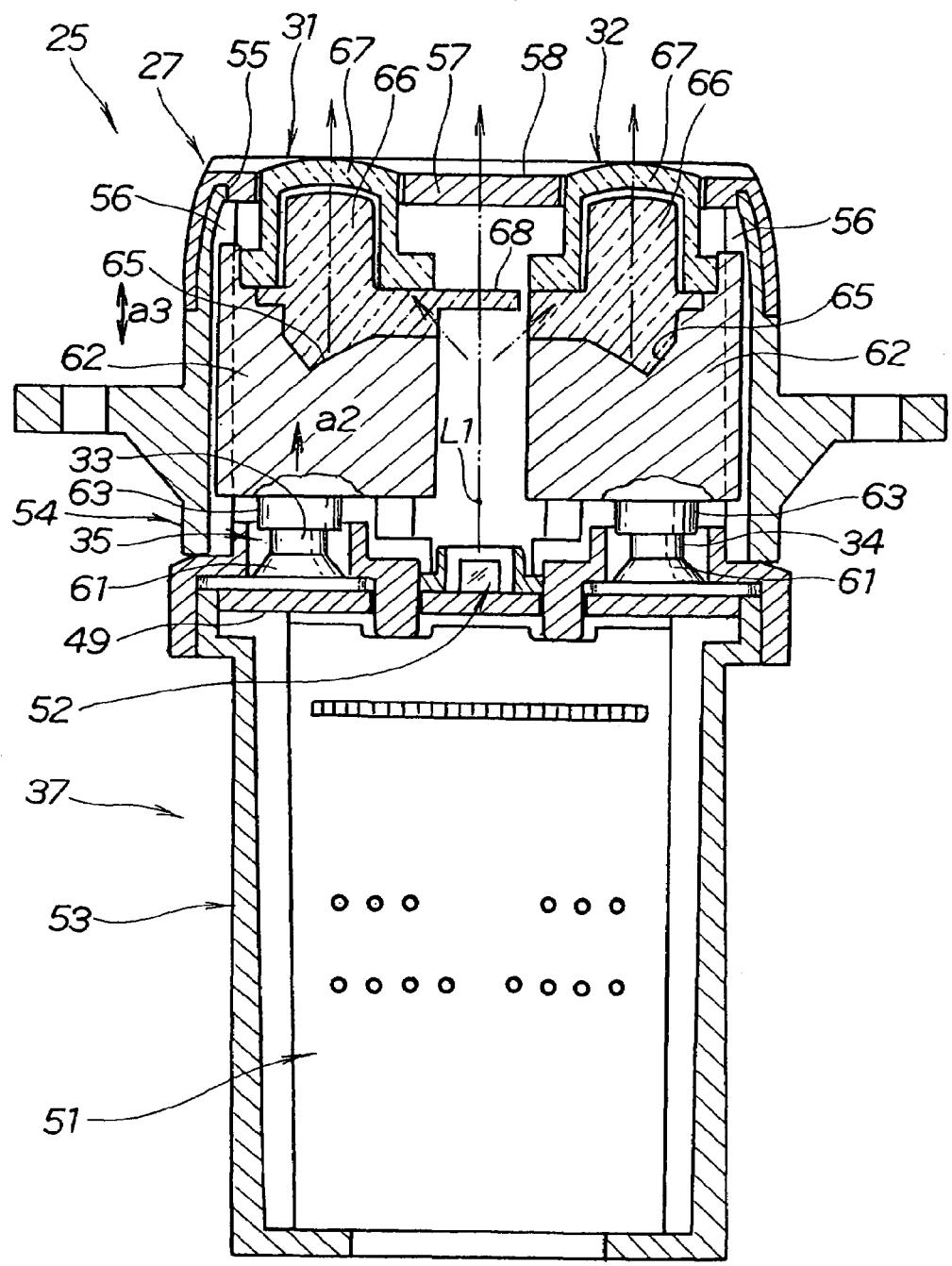
FIG. 4 is a cross-sectional view taken along line 4-4 of FIG. 3.

As shown in FIG. 4, the switch 25 includes the control member 27, the switch member 35, the case member 37, a first substrate 49 housed in the case member 37, on which the switch member 35 is mounted, a second substrate 51 to which the switch member 35 is connected, and a light-emitting diode 52 mounted on the first substrate 49 and connected to the second substrate 51.

When the headlights of the vehicle are turned on, the controller 29 turns on the light-emitting diode 52 simultaneously with the turning-on of the headlights.

The case member 37 includes a lower case body 53 housing the second substrate 51, and an upper case body 54 which can be fitted to the lower case body 53 and houses the control member 27 and the switch member 35. The upper case body 54 has an opening 55 formed in its upper portion. At side portions and a middle portion of the upper case body 54, guide portions 56, 56 (guide portion at the middle portion not shown) are formed. A panel 57 is attached to the opening 55. A mask 58 is attached to the surface of the panel 57.

The material of the upper and lower case bodies 54 and 53 is a resin material which does not transmit light L1 from the light-emitting diode 52.

The material of the panel 57 is a resin material which transmits the light L1 from the light-emitting diode 52.

The upper case body 54 and the panel 57 are molded by coinjection molding.

The first switch 33 includes a rubber case 61 and a movable contact (not shown) housed in the rubber case 61. When a finger is detached therefrom, the first push button 31 is returned in the direction shown by arrow a2 by the elasticity of the rubber case 61, returning the movable contact, to an initial state.

The second switch 34 is the same as the first switch 33.

The first push button 31 has a slide member 62 to slide in the directions of arrow a3 along the guide portion 56 at the side and the guide portion at the middle of the upper case body 54. A lower end 63 of the slide member 62 is in contact with the first switch 33. A refraction portion 65 of a substantially V-shaped groove is formed in an upper end portion of the slide member 62. A lens member 66 is fitted to the refraction portion 65. A knob member 67 is fitted onto the lens member 66.

A lens portion 68 is formed at the lens member 66. The lens portion 68 allows the light L1 from the light-emitting diode 52 to pass through the mark 42 (see FIG. 3).

The second push button 32 is similar to the first push button 31, except for the lens portion 68 of the first push button 31.

Figure 5:
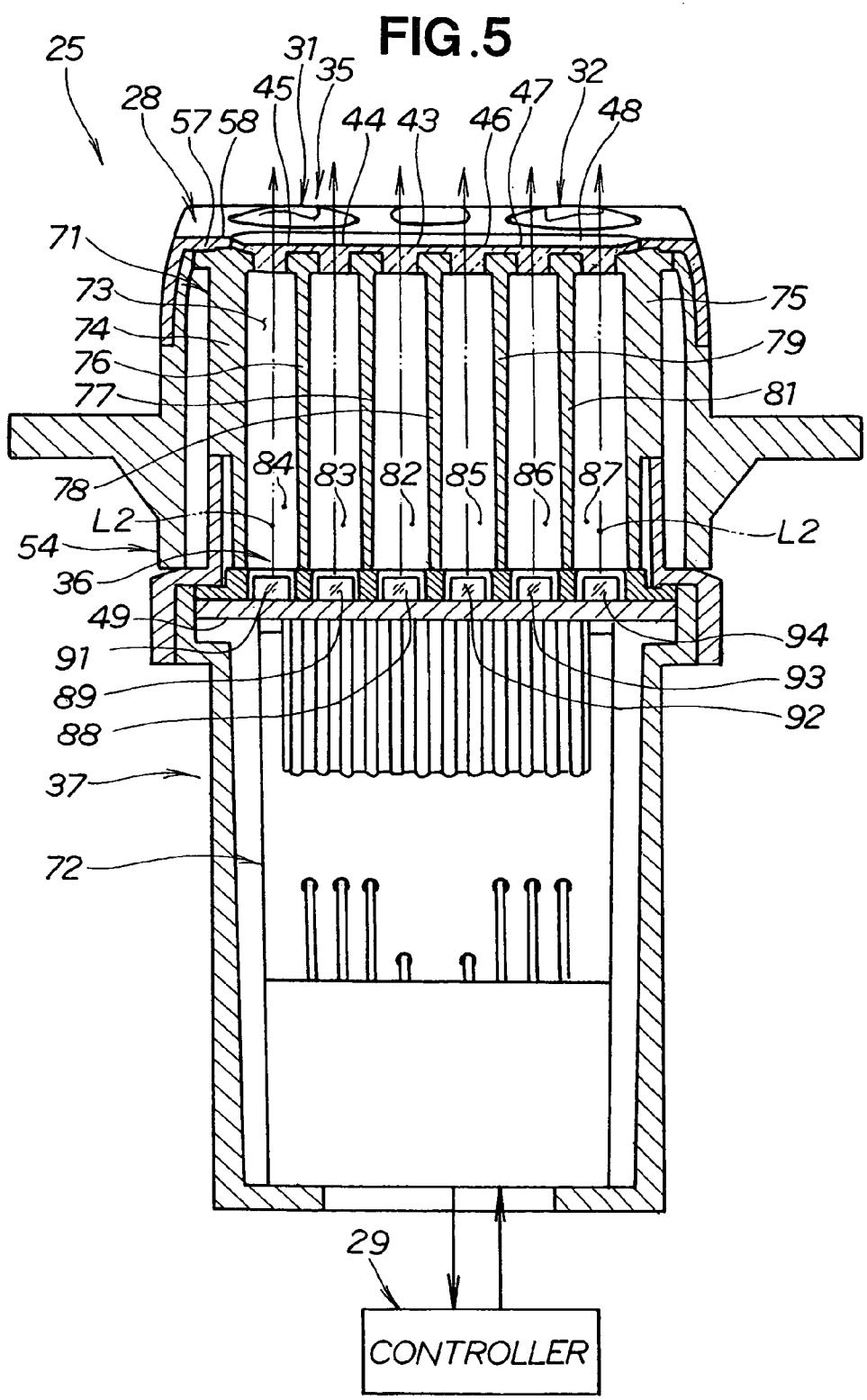
FIG. 5 is a cross-sectional view taken along line 5-5 of FIG. 3.

As shown in FIG. 5, the indicator member 28 has the first to sixth indicators 43 to 48 formed in the panel 57 of the upper case body 54. A light-guiding block 71 is fitted in the upper case body 54. The light-emitting member 36 is mounted on the first substrate 49 below the light-guiding block 71. The case member 37 houses a third substrate 72 to which the light-emitting member 36 is connected.

The light-guiding block 71 forms a partitioning side portion 73 for separating the control member 27, the switch member 35 and the light-emitting diode 52 (see FIG. 4) together, and forms a first side portion 74 and a second side portion 75 continuously with the partitioning side portion 73, and forms first to fifth barriers 76 to 79 and 81, so that the first to sixth indicators 43 to 48 are formed in the panel 57, and first to sixth spaces 82 to 87 through which light L2 from the light-emitting member 36 passes are formed.

The light-emitting member 36 is mounted on the first substrate 49 and connected to the third substrate 72, and includes first to sixth light-emitting diodes 88, 89 and 91 to 94 disposed at the bottoms of the first to sixth spaces 82 to 87. The first to sixth indicators 43 to 48 emit the light L2 by a signal from the controller 29.

The mask 58 includes a lightproof sheet (or film) which does not transmit light from the light-emitting diode 52 (see FIG. 4) and the light L2 from the first to sixth light-emitting diodes 88, 89 and 91 to 94, and a translucent sheet which transmits the light L2. The lightproof sheet is formed with sixth openings corresponding to the first to sixth indicators 43 to 48 so that light can pass therethrough, and is also formed with a figure such as the mark 42 (see FIG. 3) so that light can pass therethrough.

Next, the operation of the switch 25 used in the seat temperature regulating system 21 will be described with reference to FIG. 6.

Figure 6:
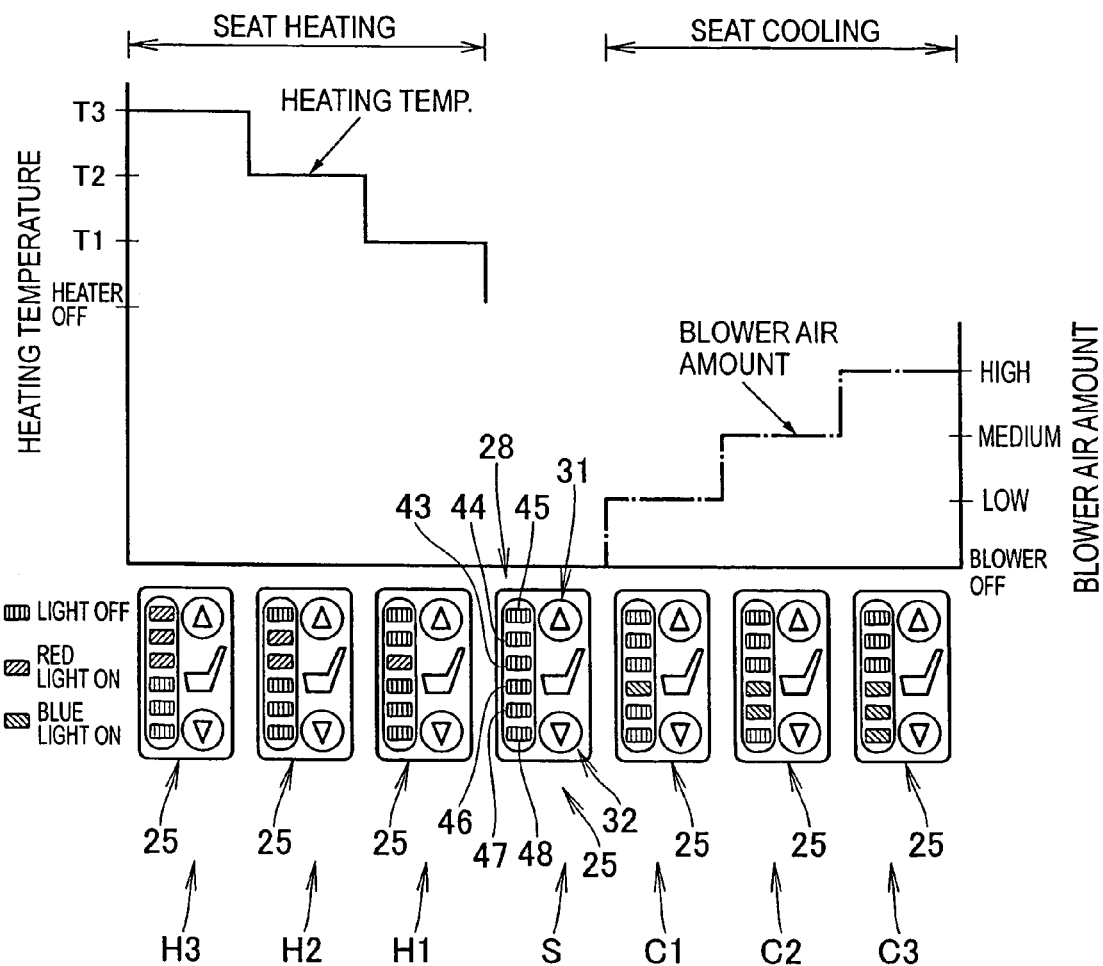
FIG. 6 is a diagram illustrating the relationship between operation of the switch shown in FIG. 3, heater temperature, and blower air amount.

FIG. 6 illustrates a relationship between the switch 25 and the heaters 22 and blowers 23 provided in the vehicle seat. The horizontal axis represents an indication of the switch 25, the left side portion of the vertical axis represents a heating temperature, and the right side portion of the vertical axis represents a blower air amount. S, H1 to H3 and C1 to C3 at the horizontal axis represent illuminated states of the first to sixth indicators 43 to 48. S represents the state where the switch 25 is off; H1 to H3, heating states; and C1 to C3, cooling states. "|" shows the light is off; "/", red light on; and "\", blue light on.

When the indicator 28 is off (in the S state), the switch 25 is off. That is, when the seat temperature regulating system 21 is not operated, the indicator 28 is completely turned off.

Then, if a driver or a front passenger pushes one of the first and second push buttons 31 and 32 (control member 27) of the switch 25, the seat temperature regulating system 21 is operated. A push of a button transmits a signal to the controller 29 (see FIG. 2). The controller 29 receives the transmitted signal, and operates the heaters 22 (see FIG. 2) or the blowers 23 (see FIG. 2) according to a preset program.

The controller 29 (see FIG. 2) counts the number of times either of the first and second push buttons 31 and 32 has been pushed. The controller 29 illuminates the indicator 28 based on the count of pushing of a switch (see first and second switches 33 and 34 in FIG. 4), and also operates the heaters 22 or the blowers 23 according to the preset program.

If the driver pushes the second push button 32 in the direction of lowering the temperature once from the S state where the indicator 28 is turned off, for example, a signal from the second switch 34 is transmitted to the controller 29. The controller 29 illuminates the fourth indicator 46, the third one from the bottom (the C1 state), and transmits a first-stage (low air amount) signal to the blowers 23 according to the control program, and operates the blowers 23 to produce a low amount of air.

If the driver once again pushes the second push button 32 in the direction of lowering the temperature, a signal from the second switch 34 is transmitted to the controller 29. The controller 29 illuminates the fourth indicator 46, the third one from the bottom, and the fifth indicator 47, the second one from the bottom (the C2 state), and transmits a second-stage (medium air amount) signal to the blowers 23 according to the control program, and operates the blowers 23 to produce a medium amount of air.

If the driver yet again pushes the second push button 32 in the direction of lowering the temperature, a signal from the second switch 34 is transmitted to the controller 29. The controller 29 illuminates the fourth indicator 46, the third one from the bottom, the fifth indicator 47, the second one from the bottom, and the sixth indicator 48, the bottommost one (the C3 state), and transmits a third-stage (high air amount) signal to the blowers 23 according to the control program, and operates the blowers 23 to produce a high amount of air.

If the driver pushes the first push button 31 in the direction of raising the temperature, a signal from the first switch 33 is transmitted to the controller 29. The controller 29 illuminates the fourth indicator 46, the third one from the bottom, and the fifth indicator 47, the second one from the bottom (the C2 state), and transmits a second-stage (medium air amount) signal to the blowers 23 according to the control program, and operates the blowers 23 to produce a medium amount of air.

If the driver again pushes the first push button 31 in the direction of raising the temperature, a signal from the first switch 33 is transmitted to the controller 29. The controller 29 illuminates the fourth indicator 46, the third one from the bottom, and transmits a first-stage (low air amount) signal to the blowers 23 according to the control program, and operates the blowers 23 to produce a low amount of air.

If the driver yet again pushes the first push button 31 in the direction of raising the temperature, a signal from the first switch 33 is transmitted to the controller 29. The controller 29 turns off all the first to sixth indicators 43 to 48 (the S state), and also stops the operation of the blowers 23 according to the control program.

If the first push button 31 in the direction of raising the temperature of the driver seat (vehicle seat) 12 (see FIG. 1) is pushed from the S state where all the first to sixth indicators 43 to 48 are turned off, the heaters 22 (see FIG. 2) are operated instead of the blowers 23. Pushing the first push button 31 illuminates the first to third indicators 43 to 45 one by one.

As described above, the switch 25 is comprised of the control member 27 including the first and second push buttons 31 and 32, the switch member 35 including the first and second switches 33 and 34 operated by the control member 27, the light-emitting member 36 including the first to sixth light-emitting diodes 88, 89 and 91 to 94 operated by a signal from the switch member 35, the indicator member 28 transmitting light from the light-emitting member 36, and the case member 37 to which the control member 27, the switch member 35, the light-emitting member 36 and the indicator member 28 are mounted together, and thus constitutes a single switch with the control member 27 and the indicator member 28 housed in the single case member 37, and can be mounted in a space approximately equal to that for a general switch, resulting in an increased degree of freedom in layout without impairing visibility and operability.

Also, the first switch 33, the second switch 34, the light-emitting diode 52, and the first to sixth light-emitting diodes 88, 89 and 91 to 94 are integrally connected together to the first substrate 49 shown in FIGS. 4 and 5, resulting in a reduced size to be able to be housed in the case member 37.

In addition, the indicator member 28, the control member 27, the switch member 35 and the light-emitting member 36 are housed in the single case member 37, constituting a single switch, so that two things, the control member 27 and the indicator member 28, can be mounted in an amount of time approximately equal to that for mounting a single general switch.

Next, an embodiment different from the switch 25 in the embodiment shown in FIGS. 3 to 5 will be described with reference to FIGS. 7 and 8.

Figure 7:
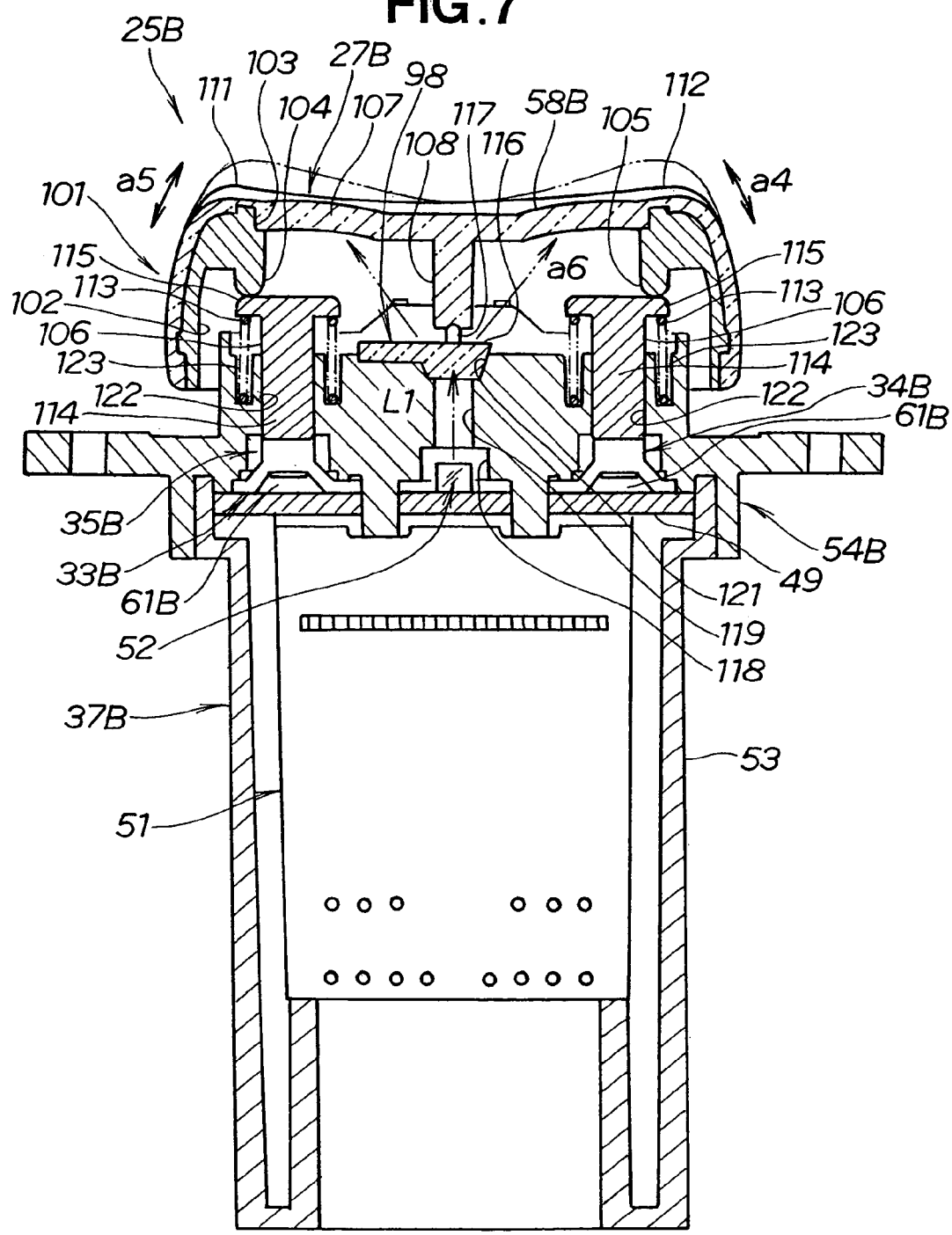
FIG. 7 is a different embodiment of the switch shown in FIG. 3 and corresponds to FIG. 4.

FIG. 7 corresponds to the figure shown in FIG. 4; FIG. 8 corresponds to FIG. 5. The same members as in the embodiment shown in FIGS. 3 to 5 are given the same reference numerals and will not be described.

A switch 25B in the different embodiment shown in FIG. 7 includes a control member 27B, a switch member 35B, a light-emitting diode 52, a lens member 98, a second substrate 51, and a case member 37B.

A part of the control member 27B and a part of an indicator member 28B (see FIG. 8) are integrally molded in a cap shape, which is referred to as a seesaw member 101.

The seesaw member 101 has an inner layer body 102 formed in a cap shape, an opening 103 formed in the center of the inner layer body 102, protruding portions 104 and 105 formed at the edge of the opening 103 in such a manner as to be able to abut on rods 106, 106, an outer layer body 107 formed integrally with the inner layer body 102, a support 108 formed at the center of the outer layer body 107, and a mask 58B attached to the surface of the outer layer body 107. The seesaw member 101 can move about the lower end of the support 108 from a free position shown in solid lines in the directions of arrow a4 or the directions of arrow a5 at a predetermined angle to move to moving limit positions shown by chain double-dashed lines.

For the material of the inner layer body 102, a resin material which does not transmit light L1 from the light-emitting diode 52 is used.

For the material of the outer layer body 107, a resin material which transmits the light L1 from the light-emitting diode 52 is used.

The inner layer body 102 and the outer layer body 107 are molded by coinjection molding.

The control member 27B includes first and second knobs 111 and 112 formed in the outer layer body 107, which correspond to first and second push buttons, the rods 106, 106 abutting on the first and second knobs 111, 112, and elastic members 113, 113 interposed between the rods 106 and an upper case body 54B.

The elastic members 113 are compression springs, for example, and return the seesaw member 101 (including the first and second knobs 111, 112) to the free position shown by solid lines via the rods 106.

Each rod 106 comprises a cylindrical body 114. An upper end of the body 114 has an abutting portion 115 in the form of a collar for allowing abutment by the protruding portions 104, 105 of the seesaw member 101 and by one end of the resilient member 113. The switch member 35B is pushed by the lower end of the body 114.

The control member 27B is exemplarily illustrated in the seesaw form in the figure, but the configuration may be any. For example, a toggle form may be used instead.

The switch member 35B includes a first switch 33B and a second switch 34B. The first switch 33B includes a case member 61B, and a movable spring (not shown) and a contact (not shown) housed in the case member 61B. When a finger is detached from the first knob 111, the elastic member 113 returns the first knob 111, and almost simultaneously, the movable spring returns the contact, and the first switch 33B returns to an initial state.

The second switch 34B is the same as the first switch 33B.

A lens portion 116 of the lens member 98 has a protruding portion 117 receiving the support 108 of the seesaw member 101. The lens portion 116 guides the light L1 from the light-emitting diode 52 to the outer layer body 107 as shown by arrow a6.

The case member 37B includes a lower case body 53 and the upper case body 54B fitted to the lower case body 53.

The upper case body 54B includes a housing recess 118 formed to house the light-emitting diode 52 in the center thereof, a through hole 119 formed in communication with the housing recess 118 to allow the light L1 from the light-emitting diode 52 to pass therethrough, a lens fitting hole 121 in an inverted trapezoidal shape formed in communication with the through hole 119 for fitting the lens member 98 therein, slide bores 122, 122 formed to allow the rods 106, 106 to slide vertically, and annular retaining grooves 123, 123 formed around the slide bores 122, 122 for retaining opposite ends of the resilient members 113.

The material of the upper case body 54B is a resin material which does not transmit the light L1 from the light-emitting diode 52.

Figure 8:
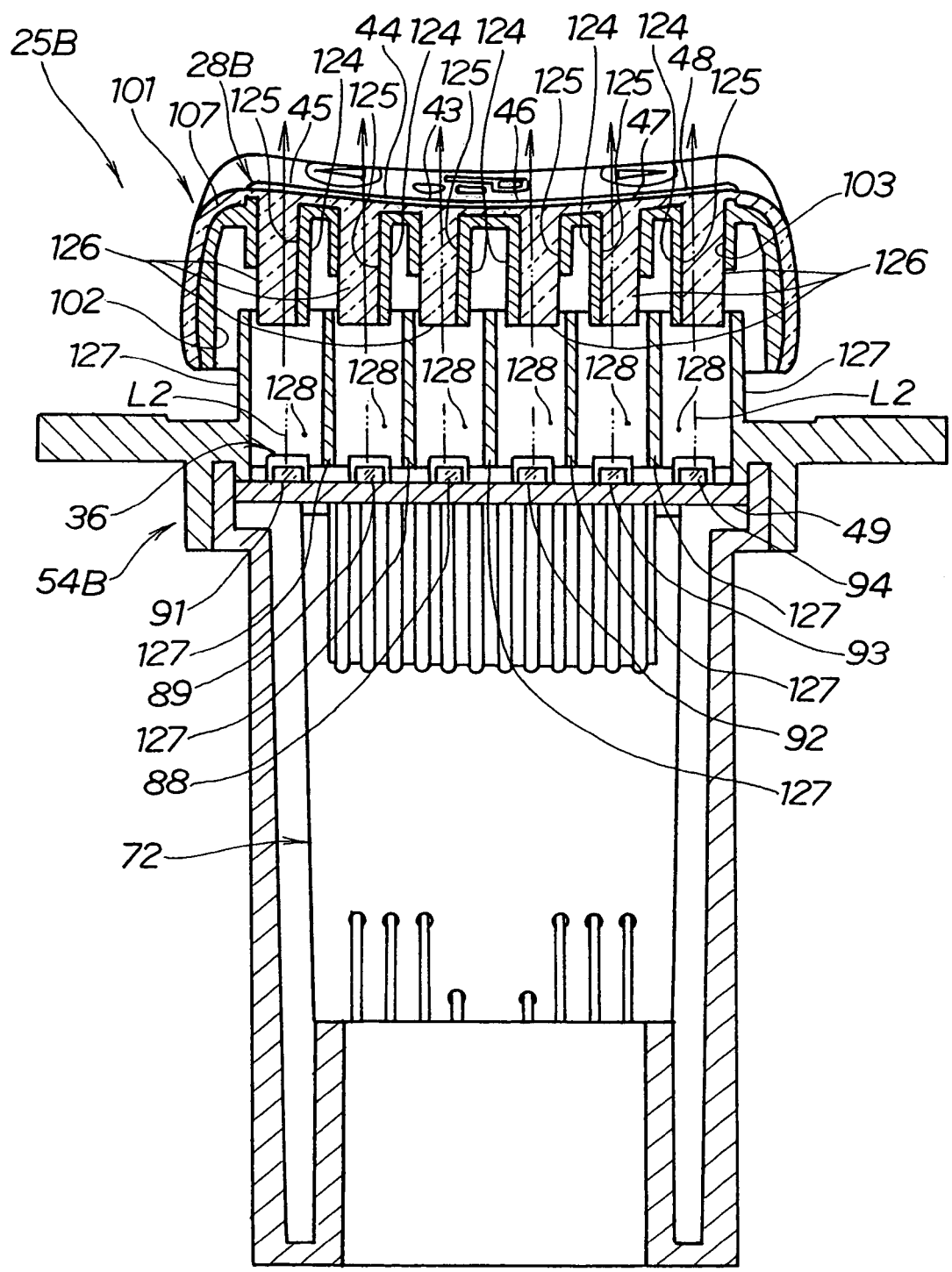
FIG. 8 is the different embodiment of the switch shown in FIG. 3 and corresponds to FIG. 5.

As shown in FIG. 8, the switch 25B includes the indicator member 28B, a light-emitting member 36, and a third substrate 72.

The seesaw member 101 has the inner layer body 102 formed with the opening 103. In the opening 103, a plurality of partitions 124 and a plurality of holes 125 are formed to allow light L2 emitted from the light-emitting member 36 to pass therethrough to the indicator member 28B. The outer layer body 107 has a plurality of light passage portions 126 integrally filling the holes 125.

The upper case body 54B has a plurality of partitions 127 and a plurality of spaces 128 next to the housing recess 118 (see FIG. 7) housing the light-emitting diode 52 (see FIG. 7). Lower end portions of the partitions 124 and the light passage portions 126 of the seesaw member 101 extend into upper portions of the spaces 128 formed by the partitions 127.

The partitions 127 and the spaces 128 guide light L2, L2 emitted from first to sixth light-emitting diodes 88, 89 and 91 to 94 of the light-emitting member 36 individually to the indicator member 28B while preventing light leaks.

To mainly describe the configuration of the indicator member 28B, the indicator member 28B includes the first to sixth indicators 43 to 48, the partitions 124 and holes 125 formed in the seesaw member 101, the light passage portions 126, and the partitions 127 and the spaces 128.

Thus, the switch 25B in the different embodiment constitutes a single switch with the control member 27B and the indicator member 28B housed in the single case member 37B.

Figure 9:
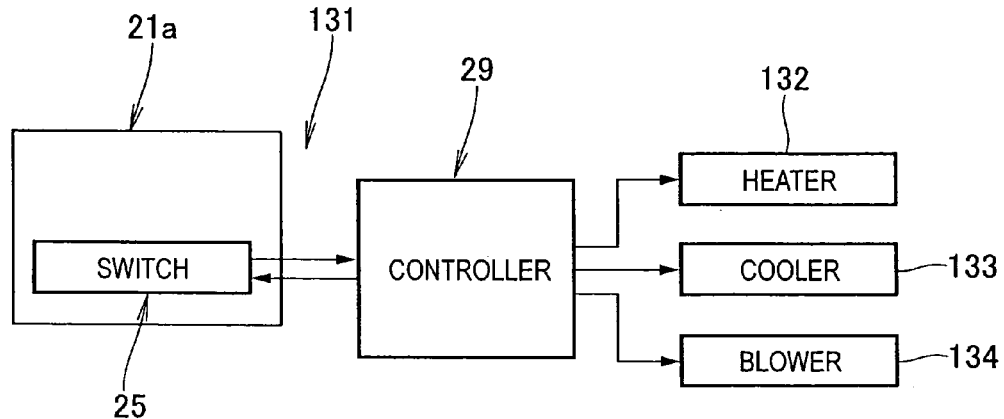
FIG. 9 is a block diagram of a vehicle interior air-conditioning system employing the temperature regulation control unit shown in FIG. 1.

Next, application of the switch 25 to a vehicle interior air-conditioning system will be described with reference to FIG. 9.

A vehicle interior air-conditioning system 131 regulates the temperature in the passenger compartment 11a (see FIG. 1), and includes a temperature regulation control unit 21a, a heater 132 for heating, a cooler 133 for cooling, a blower 134 for blowing air heated or cooled by the heater or cooler 132 or 133 by a fan or the like, and a controller 29 for controlling the heater 132, cooler 133 and blower 134. A heat source of the heater 132 may be any. The control unit 21a has a switch 25.

Figure 10:
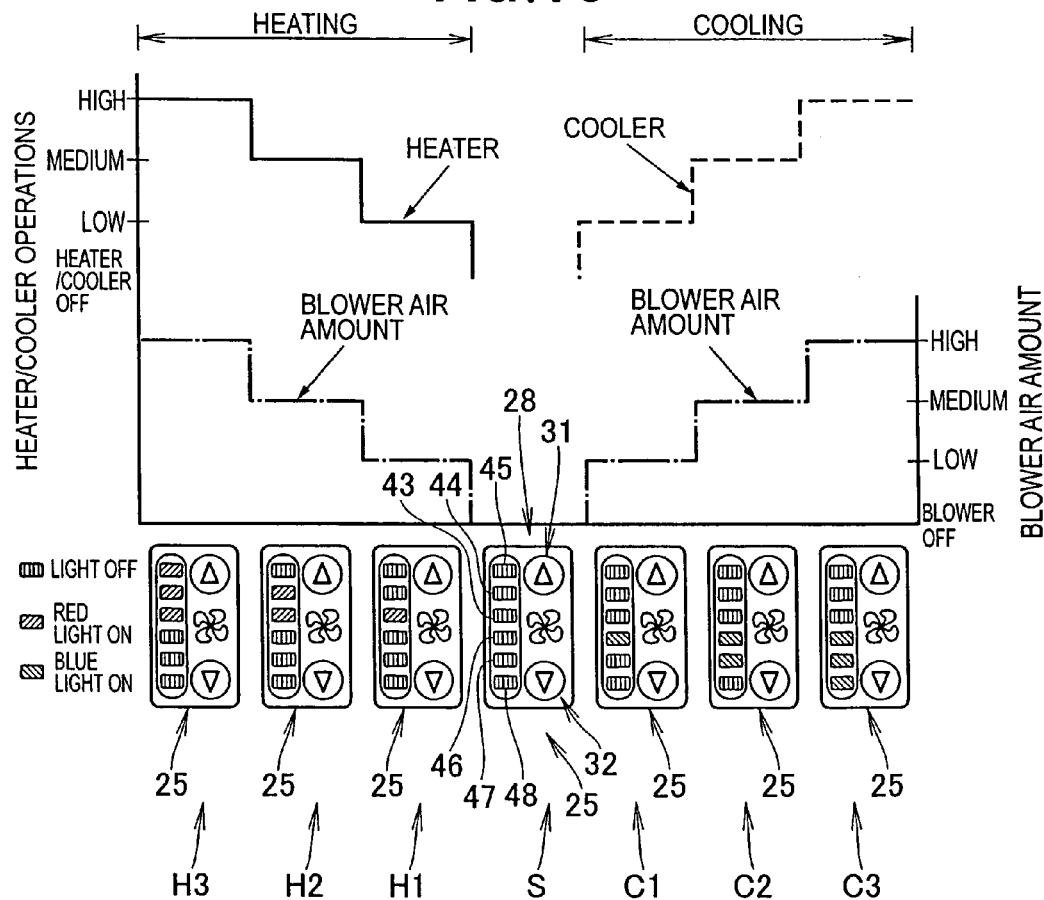
FIG. 10 is a diagram illustrating the relationship between operation of the switch shown in FIG. 3, heating-cooling, and blower air amount in the vehicle interior air-conditioning system shown in FIG. 9.
Figure 11A:
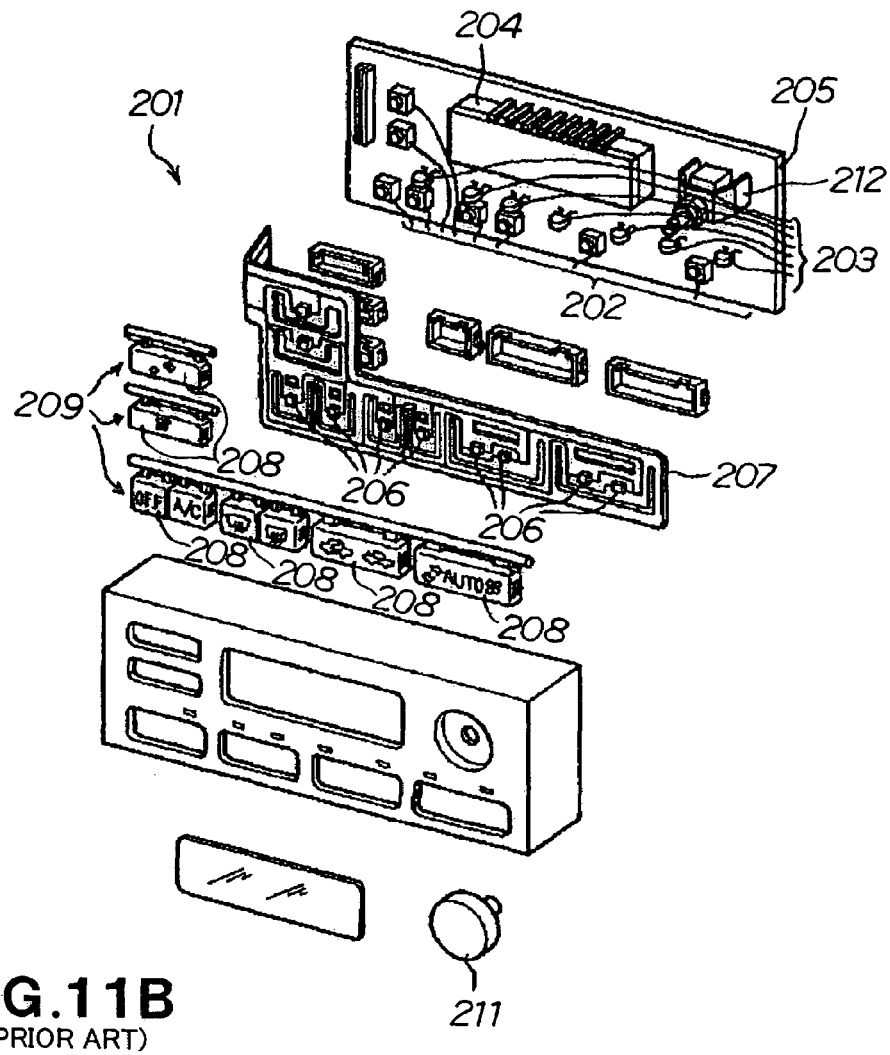
Figure 11B:
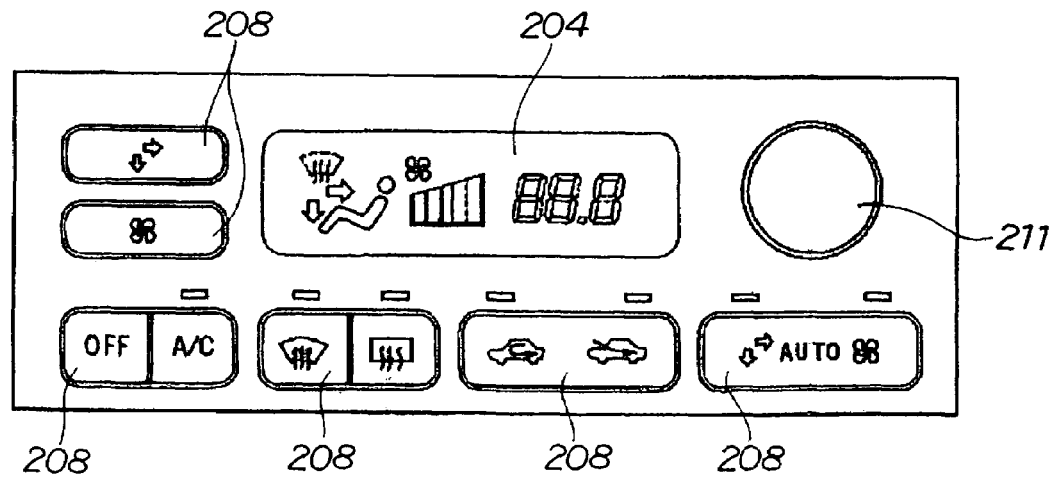
FIG. 11B is a front view of the unit.

Next, an operation of the switch 25 used in the air-conditioning system 131 of FIG. 9 will be described with reference to FIG. 10. The same members as those shown in FIG. 6 are given the same reference numerals for description. The horizontal axis represents an indication of the switch 25, the upper half of the vertical axis represents an operation of the heater 132 and the cooler 133, and the lower half of the vertical axis represents a blower air amount.

When the indicator member 28 is off, the switch 25 is off (S state). That is, when the vehicle interior air-conditioning system 131 does not operate, all the indicators 43 to 48 of the indicator member 28 are off.

When a driver or a front passenger pushes one of the first and second push buttons 31 and 32 of the switch 25, the vehicle interior air-conditioning system 131 is operated. Pushing one of the buttons 31 and 32 transmits a signal to the controller 29 (see FIG. 9). The controller 29 receives the transmitted signal and operates the heater 132 (see FIG. 9), the cooler 133 (see FIG. 9) and the blower 134 (see FIG. 9) individually according to a preset program.

The controller 29 (see FIG. 9) counts the number of times either of the first and second push buttons 31 and 32 has been pushed. Based on the count of pushing of a switch (first and second switches 33, 34 in FIG. 4), the controller 29 illuminates the indicator member 28 and also operates the heater 132, the cooler 133 and the blower 134 individually according to the preset program.

If the driver pushes the second push button 32 in the direction of lowering the temperature once from the S state where the indicator member 28 is off, a signal from the second switch 34 (see FIG. 4) is transmitted to the controller 29. The controller 29 illuminates the fourth indicator 46, the third one from the bottom (C1 state), and also transmits a signal to the blower 134 (see FIG. 9) to operate in the first stage (low air amount) and a signal to the cooler 133 (see FIG. 9) to operate in the first stage (low), according to the control program. The cooler 133 and the blower 134 operate accordingly.

If the driver once again pushes the second push button 32 in the direction of lowering the temperature, a signal from the second switch 34 (see FIG. 4) is transmitted to the controller 29. The controller illuminates the fourth indicator 46, the third one from the bottom, and the fifth indicator 47, the second one from the bottom (C2 state), and also transmits a signal to the blower 134 to operate in the second stage (medium air amount) and a signal to the cooler 133 to operates in the second stage (medium), according to the control program. The cooler 133 and the blower 134 operate accordingly.

If the driver yet again pushes the second push button 32 in the direction of lowering the temperature, a signal from the second switch 34 is transmitted to the controller 29. The controller illuminates the fourth indicator 46, the third one from the bottom, the fifth indicator 47, the second one from the bottom, and the sixth indicator 48, the bottommost one (C3 state), and also transmits a signal to the blower 134 to operate in the third stage (high air amount) and a signal to the cooler 133 to operate in the third stage (high), according to the control program. The cooler 133 and the blower 134 operate accordingly.

Then, if the driver pushes the first push button 31 in the direction of raising the temperature, a signal from the first switch 33 (see FIG. 4) is transmitted to the controller 29. The controller 29 illuminates the fourth indicator 46, the third one from the bottom, and the fifth indicator 47, the second one from the bottom (C2 state), and also transmits a signal to the blower 134 to operate in the second stage (medium air amount) and a signal to the cooler 133 to operate in the second stage (medium), according to the control program. The cooler 133 and the blower 134 operate accordingly.

If the driver again pushes the first push button 31 in the direction of raising the temperature, a signal from the first switch 33 (see FIG. 4) is transmitted to the controller 29. The controller 29 illuminates the fourth indicator 46, the third one from the bottom, and also transmits a signal to the blower 134 to operate in the first stage (low air amount) and a signal to the cooler 133 to operate in the first stage (low), according to the control program. The cooler 133 and the blower 134 operate accordingly.

If the driver yet again pushes the first push button 31 in the direction of raising the temperature, a signal from the first switch 33 (see FIG. 4) is transmitted to the controller 29. The controller 29 turns off all the first to sixth indicators 43 to 48, and also stops the operation of the blower 134 and the cooler 133 according to the control program.

If the first push button 31 in the direction of raising the temperature is pushed from the S state where all the first to sixth indicators 43 to 48 are off, operation is switched from the cooler 133 to the heater 132, and the heater 132 operates.

Pushing the first push button 31 illuminates the first to third indicators 43 to 45 one by one.

Although the temperature regulation control unit in the present invention is applied to a driver seat in the embodiments, it is also applicable to a vehicle seat other than a driver seat, and may be applied to a seat of an ordinary vehicle.

Obviously, various minor changes and modifications of the present invention are possible in the light of the above teaching. It is therefore to be understood that within the scope of the appended claims the invention may be practiced otherwise than as specifically described.

What is claimed is:

1. A switch for a temperature regulation control unit for regulating a temperature of a passenger compartment or a temperature of a vehicle seat by a heater and/or a cooler and a blower provided in a vehicle, the switch comprising:
   a control member having a plurality of buttons;
   a switch member operated by the plurality of buttons;
   a light-emitting member operated by a signal outputted from the switch member;
   an indicator member transmitting light from the light-emitting member; and
   a single case member having an upper case body and a lower case body operatively joined to the upper case body,
   wherein the control member, the switch member, and the indicator member are mounted in the upper case body and the light emitting member is mounted in the lower case body,
   wherein the indicator member includes a light-guiding block having multiple barriers forming multiple spaces whereby light from the light-emitting member passes through one of the spaces and is transmitted through the indicator member, and
   wherein the control member comprises a first push button for operation to raise the temperature, and a second push button for operation to lower the temperature.

2. A switch for a temperature regulation control unit for regulating a temperature of a passenger compartment or a temperature of a vehicle seat by a heater and/or a cooler and a blower provided in a vehicle, the switch comprising:
   a control member having a plurality of buttons;
   a switch member operated by the plurality of buttons;
   a light-emitting member operated by a signal outputted from the switch member;
   an indicator member transmitting light from the light-emitting member; and
   a single case member having an upper case body and a lower case body operatively joined to the upper case body,
   wherein the control member, the switch member, and the indicator member are mounted in the upper case body and the light emitting member is mounted in the lower case body,
   wherein the indicator member includes a light-guiding block having multiple barriers forming multiple spaces whereby light from the light-emitting member passes through one of the spaces and is transmitted through the indicator member, and
   wherein the indicator member comprises a plurality of indicators to be illuminated upon operation to raise the temperature, and a plurality of indicators to be illuminated upon operation to lower the temperature.

* * * * *